United States Patent
Tkaczyk-Walczak et al.

(10) Patent No.: US 10,740,205 B2
(45) Date of Patent: Aug. 11, 2020

(54) CALCULATION OF A SOFTWARE USAGE METRIC

(71) Applicant: International Business Machines Corporation, Armonk, NY (US)

(72) Inventors: Agnieszka Tkaczyk-Walczak, Kraków (PL); Krzysztof Fabjanski, Bielsko-Biała (PL); Marek Peszt, Kraków (PL)

(73) Assignee: International Business Machines Corporation, Armonk, NY (US)

(*) Notice: Subject to any disclaimer, the term of this patent is extended or adjusted under 35 U.S.C. 154(b) by 193 days.

(21) Appl. No.: 15/957,969

(22) Filed: Apr. 20, 2018

(65) Prior Publication Data
US 2019/0324878 A1    Oct. 24, 2019

(51) Int. Cl.
| | |
|---|---|
| *G06F 9/455* | (2018.01) |
| *G06F 11/30* | (2006.01) |
| *G06F 8/61* | (2018.01) |
| *G06F 11/34* | (2006.01) |

(52) U.S. Cl.
CPC .............. *G06F 11/302* (2013.01); *G06F 8/61* (2013.01); *G06F 9/45558* (2013.01); *G06F 11/3438* (2013.01); *G06F 2009/45562* (2013.01); *G06F 2009/45591* (2013.01)

(58) Field of Classification Search
CPC .................................................. G06F 9/45558
See application file for complete search history.

(56) References Cited

U.S. PATENT DOCUMENTS

| | | | | |
|---|---|---|---|---|
| 8,286,174 | B1* | 10/2012 | Schmidt | G06F 9/5077 709/226 |
| 8,407,669 | B2 | 3/2013 | Yee et al. | |
| 8,997,245 | B2 | 3/2015 | Chen et al. | |
| 9,473,355 | B2 | 10/2016 | Stickle | |
| 2012/0041844 | A1* | 2/2012 | Shen | G06Q 30/06 705/26.61 |
| 2016/0026449 | A1 | 1/2016 | Gierlak et al. | |
| 2017/0178008 | A1 | 6/2017 | Godowski et al. | |

(Continued)

OTHER PUBLICATIONS

McCarthy et al., "Managing Software Assets in a Global Enterprise", 2011 IEEE International Conference on Services Computing, Jul. 4-9, 2011, pp. 560-567.

(Continued)

*Primary Examiner* — Charlie Sun
(74) *Attorney, Agent, or Firm* — Grant M. McNeilly

(57) ABSTRACT

A method for calculation of at least one software usage metric is disclosed, the software usage metric describing a plurality of software products installed in a computing infrastructure including a plurality of computing machines organized into a plurality of computing groups. The method includes installing a first set of software products in each computing machine in a first computing group of a plurality of computing groups, scanning one computing machine in the first computing group to discover that the first set of software products are installed thereon; and calculating an overall usage metric for the first computing group based on a number of computing machines belonging to the first computing group and the discovered first set of software products.

18 Claims, 4 Drawing Sheets

(56) References Cited

U.S. PATENT DOCUMENTS

2017/0237646 A1    8/2017  Fabjanski et al.
2017/0279826 A1*   9/2017  Mohanty ............ G06F 9/45558

OTHER PUBLICATIONS

Swartz et al., "Software Asset Management in Large Scale Organizations Exploring the Challenges and Benefits", Bachelor of Science Thesis Software Engineering and Management, University of Gothenburg, Jun. 2013, 16 pages.

* cited by examiner

CALCULATION OF A SOFTWARE USAGE METRIC

BACKGROUND

The present disclosure relates to the field of digital computer systems, and more specifically, to the calculation of software usage metrics.

Large companies are often divided into many business units, and each business unit can have internal organizations, such as human resources (HR) or information technology (IT). Despite the business units being different, some of the organizations therein, such as HR and IT, may be similar to one another across the business units. Each of the business units, including the organizations, can be allocated numerous computing machines that include software products that are selected from predefined lists of forbidden and allowed software products, depending on the requirements of the business units and/or organization.

SUMMARY

According to some embodiments, a method for calculation of at least one software usage metric is disclosed, the software usage metric describing a plurality of software products installed in a computing infrastructure including a plurality of computing machines organized into a plurality of computing groups. The method includes installing a first set of software products in each computing machine in a first computing group of a plurality of computing groups, scanning one computing machine in the first computing group to discover that the first set of software products are installed thereon, and calculating an overall usage metric for the first computing group based on a number of computing machines belonging to the first computing group and the discovered first set of software products.

According to some embodiments, computer program product for calculating software usage is disclosed, the computer program product including a computer-readable storage medium having computer program instructions embodied therewith, the computer program instructions configured, when executed by at least one computing machine, to cause the at least one computing machine to perform a method. The method includes installing a first set of software products in each computing machine in a first computing group of a plurality of computing groups in a computing infrastructure, scanning one computing machine in the first computing group to discover that the first set of software products are installed thereon, and calculating an overall usage metric for the first computing group based on a number of computing machines belonging to the first computing group and the discovered first set of software products.

According to some embodiments, computing infrastructure includes a prime machine including a first virtual machine template with a first set of software products and a second virtual machine template with a second set of software products, a first computing group comprising a first plurality of virtual machines each including the first set of software products, and a second computing group comprising a second plurality of virtual machines each including the second set of software products. In the computing infrastructure, the prime machine is configured to calculate a software usage metric for the first computing group based on a number of virtual machines belonging to the first plurality of virtual machines and the first set of software products.

The above summary is not intended to describe each illustrated embodiment or every implementation of the present disclosure. The present disclosure also contains additional embodiments, and all of the embodiments can be freely combined with each other if they are not mutually exclusive. While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of some embodiments and do not limit the disclosure.

DETAILED DESCRIPTION

The present disclosure relates to the field of digital computer systems, and more specifically, to the calculation of software usage metrics. While the present disclosure is not necessarily limited to such applications, various aspects of the disclosure may be appreciated through a discussion of various examples using this context.

Companies often license software products from software developers, and the cost of the licenses can depend on the amount of utilization of each software product. The cost of a license can be measured periodically (e.g., once per month) using a software usage metric. A software usage metric can be based on one or more factors, for example, the number of users who can use a software product, the amount of time that a software product is used, the number of times a software product is used, and the number of computing machines that the software product is installed on. For a further example, each computer, computer processor, processor core, or virtual machine that uses a given software product may be assessed a processor value unit (PVU), indicating that one instance of the product should be accounted and paid for. Given the different software product needs of the members of each business unit and organization, quickly compiling an accurate accounting of software product utilization can be difficult.

The present disclosure may enable an efficient and systematic software utilization report to be created, which can be useful for large infrastructures such as cloud infrastructures, based on classification done for a plurality of groups of computers. The present method may improve productivity in systems involving multiple software products. The present disclosure may, for example, automatically be executed on a periodic basis (e.g., every week). In addition, the present disclosure may enable the efficient and systematic management of black and white lists of software products (e.g., prohibited and permitted software products, respectively).

Figure 1A:
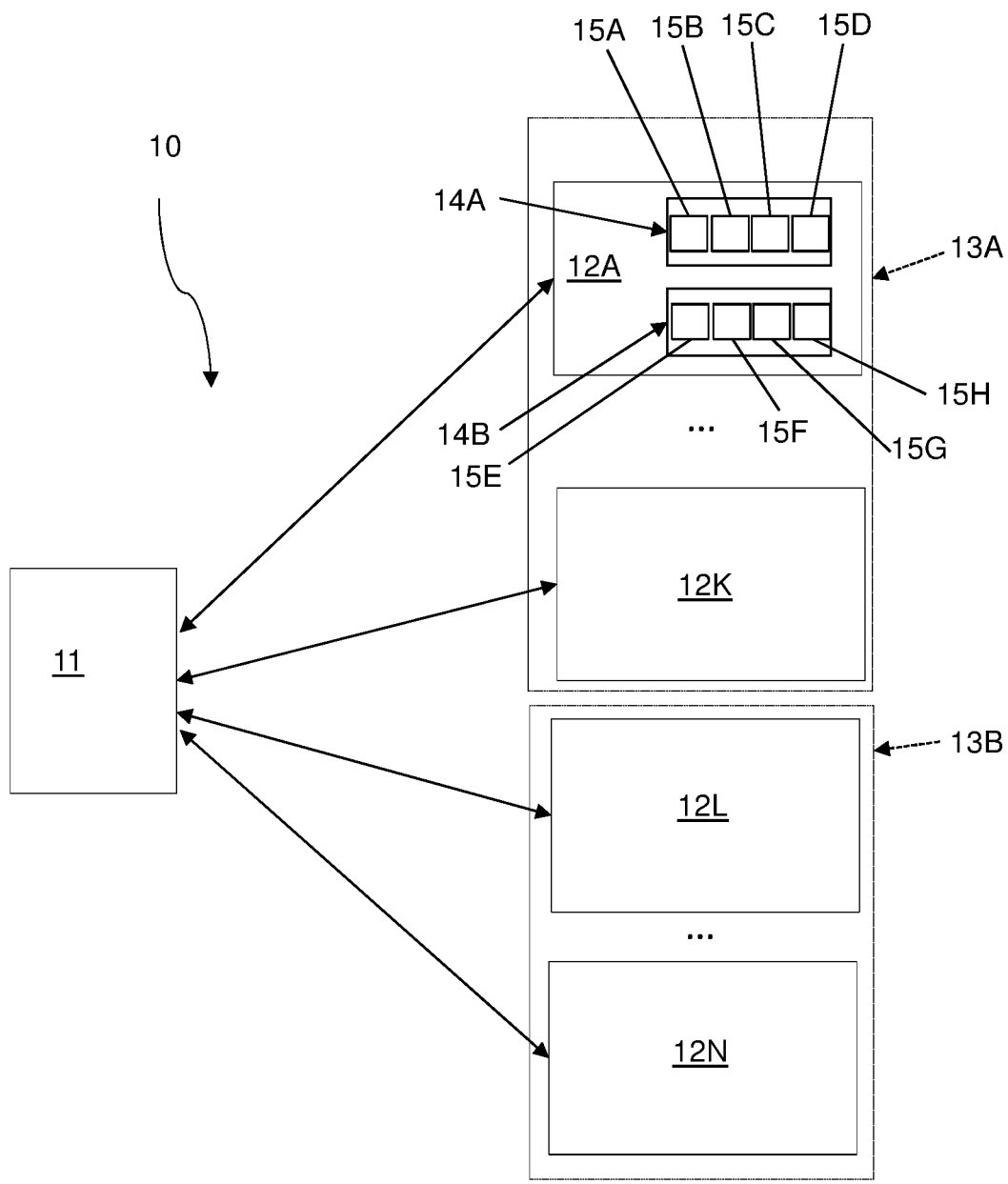
FIG. 1A depicts an example computing infrastructure.

FIG. 1A depicts an example computing environment 10 (or computing infrastructure or networking environment) in which the present disclosure may be implemented. As depicted, the computing environment 10 includes at least one control computing machine referred to as prime machine 11, and one or more computing machines 12A-N (generically referred to as computing machines 12) which are organized into groups 13A and 13B (generically referred to as groups 13) and connected to prime machine 11 via a network. The network may, for example, comprise a fixed wireless network, a wireless local area network (LAN), a wireless wide area network (WAN) a personal area network (PAN), a virtual private network (VPN), intranet, or other suitable network system or combinations thereof. The computing environment 10 may, for example, be a cloud computing environment, in which the computing machines 12A-N may constitute cloud nodes that may communicate with one another.

The components of the computing environment 10 may reside at a single site or may be dispersed over multiple sites. For example, the computing machines 12 may be separated into groups by scanning each computing machine 12 to discover properties of all computing machines 12. For example, the properties of each computing machine 12 can include, for example, physical location, logical location, business unit, business organization, processor type, other hardware characteristics, and installed or used software products. In addition, multiple groups 13 comprised of at least some of computing machines 12 may be provided with respective sets of software products. Computing machines 12 of a same group 13 of computing machines 12 may share at least part of the set of software products of that group 13. For example, group 13A, which comprises computing machines 12A-K, are used by members of an information technology (IT) department, while group 13B, which comprises computing machines 12L-N, are used by members of a human resource (HR) department. In such an example, identifying that computing machines 12A-K belong to group 13A can be done by scanning each of computing machines 12A-K and discovering a set of software products that is common to computing machines 12A-K but uncommon with computing machines 12L-N. Likewise, computing machines 12L-N can be identified based on another set of software products that is common to computing machines 12L-N but uncommon with computing machines 12A-K. In another example, computing machines 12 may be grouped by types of processors they have or by other computing properties. For example, all of computing machines 12A-K have the same type of processor in group 13A, and all of computing machines 12L-N have the same type of processor in group 13B (albeit a different type of processor than in group 13A). Furthermore, computing machine 12A may comprise multiple processors 14A and 14B, each of which may comprise multiple cores 15A-D and 15E-H, respectively. Each core 15 may be associated with a corresponding number of PVUs. Therefore, the method as described herein with reference to computing machines 12 may be applied for processors 14 and/or cores 15 (e.g., groups of processors and a reference processor to control the groups may be determined).

In some embodiments, the prime machine 11 may be configured to manage each of the computing machines 12A-N. For example, the prime machine 11 may store and/or utilize multiple sets of software products and may be configured to deploy each set of software products to the respective group 13 of computing machines 12. Therefore, prime machine 11 may comprise a map which relates each set of software products with the respective groups 13 that the software products should be installed on. In some other embodiments, each group of computing machines 13 may be managed by a different prime machine 11. In such embodiments, environment 10 may comprise two prime machines 11 such that group 13A would be managed by a first prime machine 11, and group 13B would be managed by a second prime machine 11.

In some embodiments, each of the computing machines 12A-N may have its own hardware and/or software resources that can be used by a user to execute applications, process data, etc. wherein the respective software products are copied on each computing machine. In some other embodiments, each of the groups 13A-B (or all computing machines 12A-N) may share hardware resources using virtual machines. A "virtual machine" ("VM" for brevity) may refer to a software product that emulates a physical computing environment on a computing device upon which an operating system (OS) and/or software products can be installed and run. Therefore, in some embodiments, any or all of computing machines 12A-N may be VMs, and "computing machine" as the term is used herein may refer to a virtual machine or a physical computer.

For example, each of the computing machines 12 of a group 13 (or every one of computing machines 12A-N) may host (or may themselves be) a VM and may act using the VM as an independent computing machine (e.g., having a virtual processor, memory and disk space) running, for example, an OS and a software stack comprising software products (e.g., applications or other software) of the respective computing machine 12. In such embodiments, the prime machine 11 may comprise or use a VM template that can be used to deploy the virtual machines on the computing machines 12A-N. The VM template is a pre-configured VM image that can be used to create VMs or VM instances and install software products thereon. In some embodiments, the virtual machine template may also refer to an installation script that automatically installs and configures a VM image upon usage. This is, for example, illustrated in FIG. 1B, where computing machines 12 are VMs and where the prime machine 11 may use a VM template to create computing machines 12 and install software products thereon. Each of the computing machines 12 may be assigned a certain number of resources, however each computing machine 12 may be different from other computing machines 12 in group 13. Therefore, each of the computing machines 12 may comprise a machine delta. The machine delta determines or indicates the differences (in terms of the software products) between the respective computing machine 12 and the VM image. Each of computing machines 12 may also comprise a scanner component for performing scanning of, for example, files.

Figure 1B:
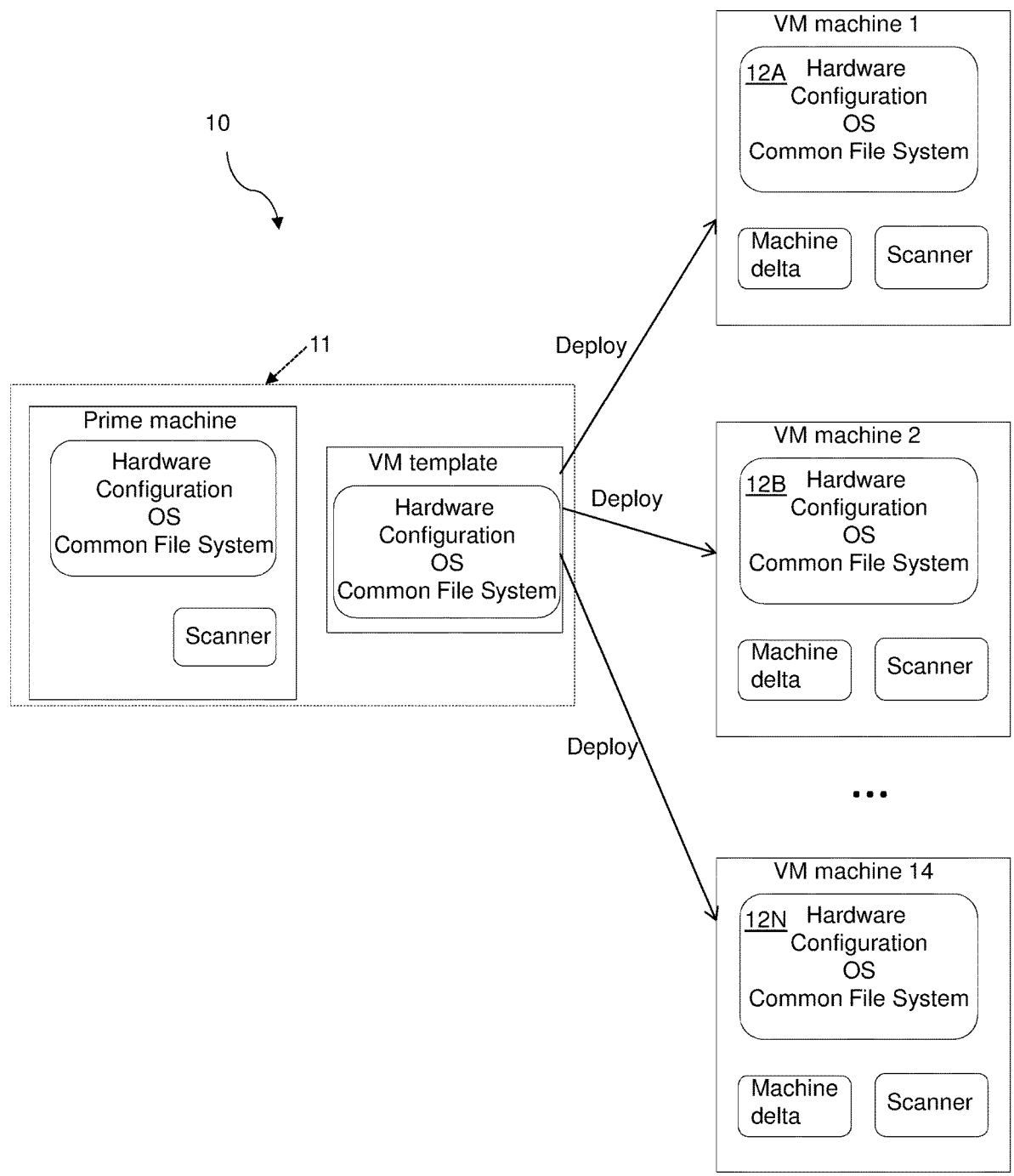
FIG. 1B depicts the computing infrastructure of FIG. 1A with virtual machines.

In both of the embodiments of FIGS. 1A and 1B (e.g., with or without VMs), each of the computing machines 12 has a respective subset of software products. In one example, the subset of software products of a given computing machine 12 may comprise at least part of the set of software products that are assigned or associated with the group 13 to which the respective computing machine belongs. In some embodiments, a computing machine 12 may comprise multiple sets of software products. In such embodiments, one set of software products may be the set of software products of the respective group 13 and another set of software products may be software products that are used by the user of the given computing machine 12 but are not included in the set of software products for the respective group 13.

Figure 2:
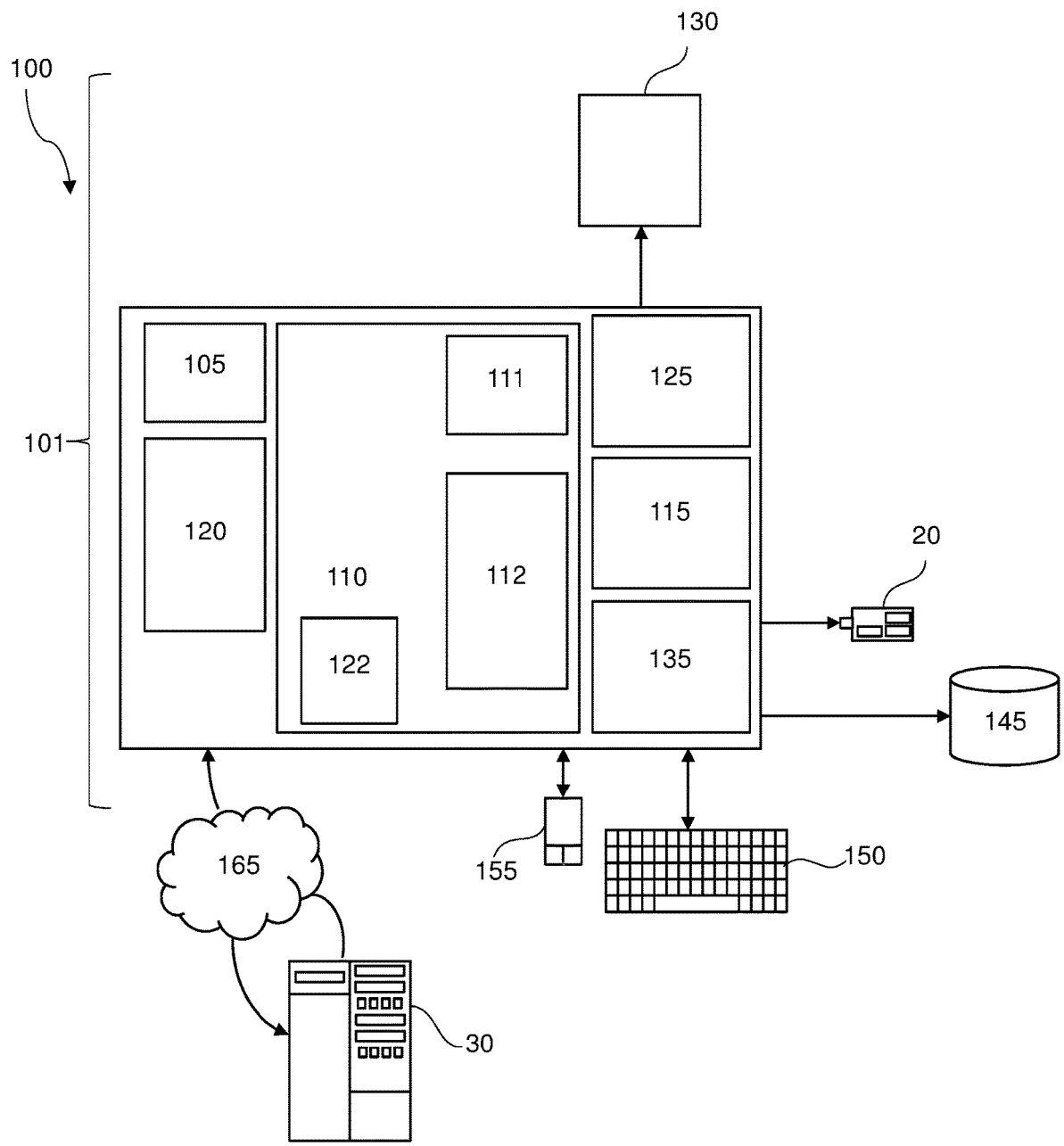
FIG. 2 represents a computerized system, suited for implementing at least some of a method involved in the present disclosure.

FIG. 2 represents a general computerized system 100, suited for implementing method steps as involved in the present disclosure. The system 100 may for example be part of environment 10 (shown in FIG. 1A) and one of prime machine 11 and computing machines 12A-N may comprise general-purpose computer 101 of system 100. In another example, the system 100 may not be part of the environment 10 and may be configured to connect to the components of environment 10 such that it may perform the present method.

It will be appreciated that embodiments of methods described herein are at least partly non-interactive in that a portion or portions of the execution of the methods are not controlled by a user through a user interface. Instead, a portion or portions of the execution of the methods are automated by way of computerized systems, such as servers or embedded systems. In exemplary embodiments though, the methods described herein can be implemented in a (partly) interactive system. In exemplary embodiments, the methods described herein are implemented in software, as an executable program, and is executed by a special or general-purpose digital computer, such as a personal computer, workstation, minicomputer, mainframe computer, or virtual machine. More specifically, these methods can be implemented in software 112 (including firmware 122), hardware (e.g., processor) 105, or a combination thereof.

In some embodiments, in terms of hardware architecture as shown in FIG. 2, the computer 101 includes a processor 105, main memory 110 coupled to a memory controller 115, and two input and/or output (I/O) devices (or peripherals) 20 and 145 (although there may be more I/O devices) that are communicatively coupled via a local I/O controller 135. The input/output controller 135 can be, but is not limited to, one or more buses or other wired or wireless connections, as is known in the art. I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20 and 145 may generally include any generalized cryptographic card or smart card.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, processor core, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM)), electronically erasable programmable read only memory (EEPROM), and programmable read only memory (PROM). Note that the memory 110 can have a distributed architecture, where various components are situated remotely from one another but can be accessed by the processor 105.

The software in memory 110 may include one or more separate programs, each of which comprises an ordered listing of executable instructions 112 for implementing logical functions, notably functions involved in embodiments of the present disclosure. In the example of FIG. 2, software in the memory 110 includes instructions 112 which are instructions to manage databases, such as a database management system.

The software in memory 110 shall also typically include a suitable operating system (OS) 111. The OS 111 essentially controls the execution of other computer programs, such as software 112 for implementing methods as described herein.

The methods described herein may be in the form of software 112 which may be a source program, executable program, object code, script, or any other entity comprising a set of instructions to be performed. When software 112 is a source program, then the source program may be translated via a compiler, assembler, interpreter, or the like, which may or may not be included within the memory 110, so as to operate properly in connection with the OS 111. Furthermore, the methods can be written in an object-oriented programming language, which has classes of data and methods, or a procedure programming language, which has routines, subroutines, and/or functions.

In some embodiments, a conventional keyboard 150 and mouse 155 can be coupled to the I/O controller 135. Other devices such as the I/O devices 145 may include other input or output devices, for example but not limited to printers, scanners, microphones, and the like. Finally, the I/O devices 10 and 145 may further include devices that function as both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10 and 145 can be any generalized cryptographic card or smart card.

System 100 can further include a display controller 125 coupled to a display 130. In exemplary embodiments, the system 100 can further include a network interface for coupling to a network 165. The network 165 can be an IP-based network for communication between the computer 101 and any external server, client, and the like via a broadband connection. The network 165 transmits and receives data between the computer 101 and external systems 30, which can be involved to perform part or all of the methods discussed herein. In some embodiments, network 165 can be a managed IP network administered by a service provider. The network 165 may be implemented in a wireless fashion using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet, or other suitable network system and includes equipment for receiving and transmitting signals.

If the computer 101 is a PC, workstation, intelligent device, or the like, software 112 in the memory 110 may further include a basic input output system (BIOS) 122. BIOS 122 is a set of essential software routines that initialize and test hardware at startup, start OS 111, and support the transfer of data among the hardware devices. BIOS 122 is stored in ROM so that BIOS 122 can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 2, the methods can be stored on any computer readable medium, such as storage 120, for use by or in connection with any computer related system or method. The storage 120 may comprise a disk storage such as HDD storage.

Figure 3:
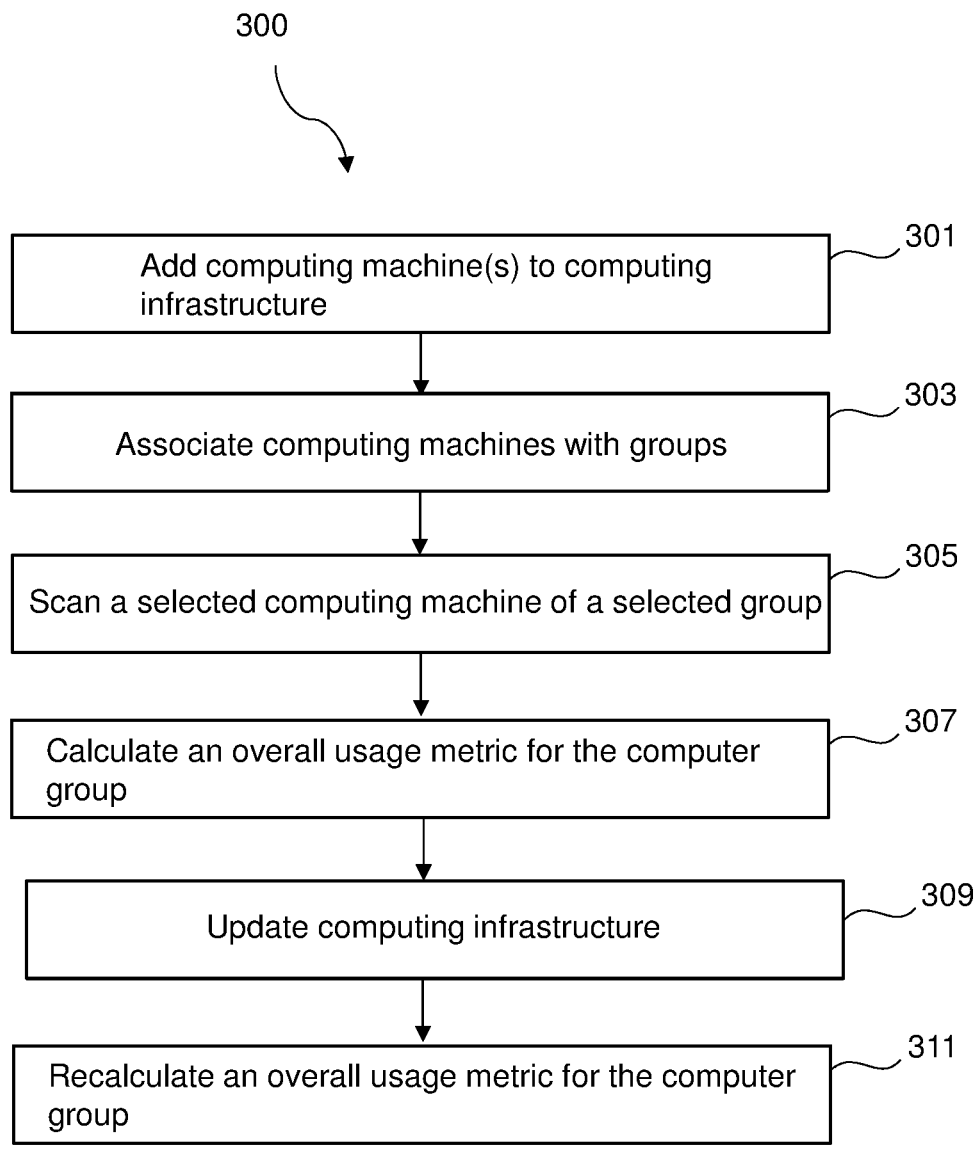
FIG. 3 is a flowchart of a method for calculation of a software usage metric.

FIG. 3 is a flowchart of method 300 for calculation of at least one software usage metric in a computing infrastructure such as computing environment 10 (shown in FIG. 1A). The software usage metric being measured by method 300 is an overall usage metric that describes the total number of instances of a particular set of used software products in the computing infrastructure. Thereby, the overall usage metric accounts for each computing machine upon which is installed a software product of interest (e.g., one the software product from a set of software products) across all the products of interest.

In step 301, a plurality of computing machines 12 are added to computing infrastructure 10. In some embodiments, step 301 may be performed by an administrator of computing infrastructure 10, users of computing machines 12, prime machine 11, and/or another computing machine 12. In step 303, at least some of computing machines 12 are associated with one of a plurality of computing groups 13 (although in some embodiments, there is only one computing group 13). In some embodiments, step 303 may be performed by an administrator of computing infrastructure 10, users of computing machines 12, prime machine 11, and/or another computing machine 12. In addition, in either or both of steps 301 and 303, at least a first software set is installed on at least some of computing machines 12. In some embodiments, this task is performed by an administrator of computing infrastructure 10, users of computing machines 12, prime machine 11, and/or another computing machine 12. In some embodiments that include VMs as computing machines 12, this task can be performed using a VM template hosted by, for example, prime machine 11 or another computing machine 12.

In step 305, in some embodiments, a single computing machine 12 in a single group 13 is selected for scanning by, for example, prime machine 11. In some other embodiments, multiple computing machines 12 are selected, although the number of selected computing machines 12 from a single group 13 is less than the total number of computing machines 12 in that group 13 (i.e., only some of the computing machines 12 in a group 13 are scanned). For simplicity, steps 305-309 will be described as though only one computing machine 12 will be scanned per group 13. Regardless of which computing machine 12A-N or which respective group 13A or 13B is selected, the selected computing machine 12 may be referred to as reference computing machine 12' and the respective selected group 13 can be referred to as reference computing group 13'. Reference computing machine 12' may be a randomly selected computing machine 12 of the reference computing group 13' or may be a predefined (e.g., user defined) computing machine 12 of the reference computing group 13'. In addition, which computing machine 12 is the reference computing machine 12' may remain the same for subsequent scans or it may change to a different computing machine 12.

The scanning of reference computing machine 12' may be performed to discover the first set of software products being installed thereon. The first set of software products may comprise software products that are used or that run on the reference computing machine 12' (e.g., the first set of software products may comprise software products that ran at least once on the reference computing machine 12' during a predefined time period, for example, during the last calendar month).

In step 307, an overall usage metric may be calculated for the reference computing group 13' based on the number of computing machines 12 belonging to that group 13' and the discovered first set of software products. The overall usage metric may, for example, be defined as the multiplication of the number of computing machines 12 in group 13' by a license value metric associated with the reference computing machine 12'. The license value metric is calculated based on the first set of software products. For example, depending on the number of cores 15 that use each product of the first set, the license value metric may be determined. A more specific example using computing infrastructure 10 in FIG. 1A is as follows: computing machine 12A includes two processors 14 each having four cores 15. If there are three software products in the first set and if each core has a value of one PVU, then the license value metric would be: 3 (the number of products in the first set)*2 (the number of processors 14 per computing machine 12)*4 (the number of cores 15 per processor 14)*1 (the number of PVUs per core 15). The result would be a license value metric of 24, and this result can be multiplied by the price per PVU to produce the license fee due to the usage of the first set of software products on computing machine 12A. In addition, if each computing machine 12A-K is identical in terms of numbers of processors 14 and cores 15, then an overall usage metric would be 24 (the license value metric)*11 (the number of computing machines 12A-K). The result would be an overall usage metric of 264, and this result can be multiplied by the price per PVU to produce the total license fee due to the usage of the first set of software products in group 13A.

In step 309, computing infrastructure 10 is updated. In some embodiments, the scan of computing machine 12' in step 305 may reveal software products that are on the black list. In such embodiments, in step 309, an alert can be sent, for example, to the user of computing machine 12' and/or to the administrator of computing infrastructure 10. In addition or in the alternative, the black-list software products may be automatically removed from computing machine 12' in step 309. In some embodiments, finding a black-list software product on computing machine 12' may initiate scans of all computing machines 12 in reference computing group 13' or all of computing machines 12 in computing infrastructure 10 in step 309, with remedial action being taken thereafter if appropriate.

In some embodiments, the scan in step 305 may reveal software products that are neither on the black list, the white list, or the VM template on computing machine 12'. In such embodiments, in step 309, an alert can be sent, for example, to the user of computing machine 12' and/or to the administrator of computing infrastructure 10. In addition or in the alternative, such software products may be automatically removed from computing machine 12' in step 309. In addition or in the alternative, such software products may be automatically added to either the black list, the white list, and/or the VM template in step 309. In some embodiments, in step 309, a scan of all computing machines 12 in reference computing group 13' or all of computing machines 12 in computing infrastructure 12 may be scanned. If a certain number or percentage of computing machines 12 include such software products, an alert can be sent, for example, to the user of computing machine 12' and/or to the administrator of computing infrastructure 10. In addition or in the alternative, such software products may be automatically added to all of computing machines 12 in group 13' or in computing infrastructure 10 in step 309. In addition or in the alternative, such software products may be automatically added to either the black list, the white list, and/or the VM template in step 309.

In some embodiments, step 309 may also be performed after a new computing machine 12" that has been added to computing infrastructure 10 in steps 301 and 303 and scanned in step 305, as discussed below. In such embodiments, new computing machine 12" would be purposefully selected as reference computing machine 12' for step 305.

In step 311, the overall usage metric may be recalculated in light of updates to computing infrastructure 10 in step 309, for example, changes to the white or black lists, VM templates, or deployed software products. If there were no updates to computing infrastructure 10 in step 309 (e.g., the only software products found in the scan of step 305 were on the white list and/or in the VM template), then step 311 may be skipped to avoid using computer processing resources to perform a redundant step of method 300.

In some other embodiments, method 300 may be applied to a computing infrastructure 10 comprising multiple processors on a single computing machine 12, wherein what is described for a computing machine in FIG. 3 may be performed for a processor 14. For example, reference computing machine 12' may be a reference processor 14'. In such embodiments, the reference group 13' may be a group 13 of processors 14.

According to some embodiments, the discovering and the identifying of computing group 13' (e.g., steps 301 and 303) are performed iteratively for all of the prime machines 11. For example, each of the prime machines 11 may be configured to control or manage computing machines 12 in one or more groups 13, respectively. Then method 300 may be repeated for each of the control computing machines 11 such that the overall usage metric is defined for each respective group 13. This may enable an overall measurement and/or control of the software usage in computing infrastructure 10.

According to some embodiments, some or all of method 300 (e.g., steps 303-311) may be performed iteratively for each additional new computing machine 12" that successively joins computing infrastructure 10. For example, as soon as a new computing machine 12' is integrated in the computing infrastructure 10, method 300 may automatically be executed to re-evaluate the overall license value metric. This embodiment may enable a reactive system that has up-to-date information on the software usage.

According to some embodiments, some or all of method 300 (e.g., steps 303-311) may be performed iteratively according to a schedule (e.g., periodically). This may save resources compared to the previous embodiments in particular when computing infrastructure 10 has not changed, and thus method 300 would provide the same result as the previous iteration of method 300. In addition, this may save resources compared to the previous embodiments in particular when of a plurality of new computing machine 12" are added to computing infrastructure 10 in rapid succession to avoid performing method 300 after each new computing machine 12" has been added (since method 300 should only be performed once after all of the set of new computing machine 12" have been added).

According to some embodiments, calculating the overall usage metric comprises multiplying a license value metric associated with the reference computing machine 12' with the numbers of computing machines belonging to the group 13', the license value metric being calculated based on the first set of software products. For example, a PVU may be used so that each software product of the first set of software products has a respective price per PVU. For example, the PVU for a given product may be calculated by multiplying predefined values associated to a model of processor by number of cores in correspondence to the given product. A PVU is a unit of measure used to differentiate licensing of software on distributed processor technologies defined for example by processor type and model number.

According to some embodiments, the method comprises scanning one computing machine 12 of reference group 13' other than reference computing machine 12' to discover installed software products and, based on comparing results of the scanning with the first set of software products, updating the set of software products installed on reference computing machine 12'. This may further improve the monitoring and thus control of the software usage in the computing infrastructure because reference computing machine 12', on which the overall usage metric is based, is a reliable representative of group 13'. For example, this embodiment may be performed before the determining the first set of software products. In another example, this embodiment may be performed after the determining of the first set of software products. In this case, method 300 may be repeated for using the updated content of reference computing machine 12'.

According to some embodiments, prime machine 11 hosts one or more VM templates and is configured for using a VM template for creating and installing VMs on a respective group 13 of computing machines 12 of the computing infrastructure 10, wherein a VM comprises a set of software products. This embodiment may seamlessly be integrated in existing computing infrastructures such as cloud computing infrastructures.

According to some embodiments, method 300 further comprises providing a mapping between sets of software products and respective groups 13 of computing machines 12 of the computing infrastructure 10, wherein identifying the one of the plurality of computing groups 13, is performed using the mapping. This may enable a systematic and controlled approach for automatically evaluating the software usage in computing infrastructure 10.

The following is another example method for computing an overall usage metric.

1. Scan results may be obtained by scanning prime machine 11 dedicated for a specific reference group 13 of computing machines 12. Prime machine 11 may for example store a VM template or may be defined as a "clean" machine. Based on the scan results a pre-estimated license report (or overall usage metric) may be prepared or calculated as a multiplication of number of machines 12 multiplied by files that are discovered on a reference computing machine 12' of the reference group 13'. And, when a new VM is added from the VM template to computing infrastructure 10, a predefined value of license may be added to the overall usage metric value.

For example, black and white lists may be defined for reference group 13' indicating the list of software products that cannot be used or that can be used, respectively. For example, based on a scan result a new rule may be defined in a black list or white list. The lists may be used to filter the scan results (e.g., to find the first set of software products).

2. In order to further improve method 300, a schedule may be defined which sets a predetermined time period between performances of method 300. The schedule indicates that reference machine 12' of the reference group 13' is to be scanned and further indicates another selected machine or computing machine 12 (such as a newly-added computing machine 12") from group 13' to be scanned as well. This allows for the skipping of scans every time a new computing machine is added, which can save repetitive scanning when a significant number of computing machines 12 are added to group 13' in a short period of time.

For example, a full scan may be performed on new computing machine 12". The results of the full scan of new computing machine 12" and the reference machine 12' can be compared and may result in a machine delta (e.g., machine delta means only files that are not included in the reference machine 12', the rest may be excluded from scanning) The differences may be put on a pending queue for reference machine 12' so that the machine delta software products can be added to list of files to exclude from scanning and/or add to reference machine 12'.

3. After scans on all VM machines 12 of a reference group 13' (excluding reference machine 12'), it may be determined which software products in pending list are valid. The determined software products may be added to reference machine 12', prime machine 11 and/or the white list. In one example, a software product may be qualified as valid if it fulfills a trust threshold, for example, if the software product is found on more than 70% machines 12 of the reference group 13'.

4. A final utilization report may be recalculated. For example, based on new changes, a value of license may be calculated on a singular reference machine 12' and then multiplied by number of machines 12 in the computing infrastructure. This algorithm may be more efficient when executed in areas of similar reference groups 13, because chances to have similar software products on all machines 12 are high. In this way, embodiments may improve the performance and efficiency of a computing machine (e.g., prime machine 11). For example, less computer processing resources are used to calculate license values because only one computing machine 12 is scanned as opposed to scanning an entire group 13. Furthermore, only the information regarding one computing machine 12 is stored instead of storing information about the entire group. Additionally, the software usage metric can be calculated even if some of the computing machines 12 in a group 13 are not communicatively connected to prime machine 11 at the time of inquiry. This is because only one computing machine 12 is scanned, so communication with every group member is not required. In some embodiments, the overall usage metric is an estimation of a software usage metric. In such embodiments, users may have independent rights to install and/or uninstall software products from their individual computing machine, so there is not a guarantee that all the computing machines have the software products of interest. In other embodiments, such as an embodiment where every computing machine 12 in a group 13 is made from the same VM template and the installation and uninstallation of software products of interest is centrally controlled, the overall usage metric is an accurate accounting of a software usage metric.

Detailed scan results may also be sent to the owner or the user of the machine 12' scanned for receiving a confirmation of the scan results. If the owner confirms, this confirmation may for example be reflected in the report. But a message may be sent to the software asset manager (SAM) to notify them about any exemptions in infrastructure 10, such as, for example, a deviation from the black and/or white lists or different deviation from a general rule of what software can be installed and what software cannot. As stated previously, white and black lists are used in order to detect software which is prohibited or allowed. They may for example be used to determine if the first set of software products are allowed products.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "each" does not necessarily equate to the term "all" as the term "all" is used colloquially. For example, the following two phrases have different meanings: "a car having a plurality of tires, each tire of the plurality of tires being fully inflated" and "a car that has all of its tires fully inflated". The former phrase would encompass a car with three fully-inflated tires (the plurality of tires) and one flat tire (not included in the plurality of tires). The latter phrase would not encompass such a car (because not all of the car's tires are fully inflated). Likewise, the phrase "a computer having a set of files, each file of the set of files being read-only" would encompass a computer having two files, one of which is read-only (and belongs to the set of files) and one of which is not read-only (and does not belong to the set of files).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

The invention claimed is:

1. A method for calculation of at least one software usage metric, the software usage metric describing a plurality of software products installed in a computing infrastructure comprising a plurality of computing machines organized into a plurality of computing groups, the method comprising:
    installing a first set of software products in each computing machine in a first computing group of a plurality of computing groups;
    scanning one computing machine in the first computing group to discover that the first set of software products are installed thereon; and
    calculating an overall usage metric for the first computing group based on a number of computing machines belonging to the first computing group and the discovered first set of software products.

2. The method of claim 1, wherein each computing machine in the first computing group shares a property selected from the group comprising: a physical location, a logical location, a business unit, a business organization, a processor type, and a hardware characteristic.

3. The method of claim 1, further comprising:
    adding a new computing machine to the first computing group, the new computing machine comprising a new set of software products;

scanning the new computing machine to discover that the new set of software products are installed thereon;

comparing the new set of software products and the first set of software products to determine a delta set of software products;

adding the delta set of software products to the one computing machine;

rescanning the one computing machine in the first computing group to discover that the first set of software products and the delta set of software products are installed thereon; and recalculating an overall usage metric for the first computing group based on a number of computing machines belonging to the first computing group and the discovered first set of software products and delta set of software products.

4. The method of claim 3, wherein the scanning the new computing machine, comparing, adding, rescanning and recalculating is performed iteratively for each additional new computing machine that successively joins the first computing group of the computing infrastructure.

5. The method of claim 3, wherein the scanning the new computing machine, comparing, adding, rescanning and recalculating is performed iteratively according to a schedule.

6. The method of claim 1, wherein calculating the overall usage metric comprises multiplying a license value metric associated with the one scanned computing machine with the number of computing machines belonging to the first computing group, the license value metric being calculated based on the first set of software products.

7. The method of claim 1, wherein before calculating the overall usage metric, the method further comprises:

scanning another computing machine of the first computing group other than the one computing machine for an additional set of software products;

comparing the additional set of software products and the first set of software products to determine a delta set of software products; and adding at least some of the delta set of software products to the one computing machine.

8. The method of claim 7, further comprising:

adding the at least some of the delta set of software products to each computing machine in the first computing group.

9. The method of claim 1, wherein the installing a first set of software products in each computing machine is performed by a prime machine that hosts one or more virtual machine templates and is configured for using one of the hosted virtual machine templates for creating at least some of the computing machines as virtual machines in the computing infrastructure and installing the first set of software products thereon.

10. The method of claim 9, wherein each computing machine in the first computing group is created using the same virtual machine template.

11. A computer program product for calculating software usage, the computer program product comprising a computer-readable storage medium having computer program instructions embodied therewith, the computer program instructions configured, when executed by at least one computing machine, to cause the at least one computing machine to perform a method comprising:

installing a first set of software products in each computing machine in a first computing group of a plurality of computing groups in a computing infrastructure;

scanning one computing machine in the first computing group to discover that the first set of software products are installed thereon; and calculating an overall usage metric for the first computing group based on a number of computing machines belonging to the first computing group and the discovered first set of software products.

12. The computer program product of claim 11, wherein each computing machine in the first computing group shares a property selected from the group comprising: a physical location, a logical location, a business unit, a business organization, a processor type, and a hardware characteristic.

13. The computer program product of claim 11, further comprising:

adding a new computing machine to the first computing group, the new computing machine comprising a new set of software products;

scanning the new computing machine to discover that the new set of software products are installed thereon;

comparing the new set of software products and the first set of software products to determine a delta set of software products;

adding the delta set of software products to the one computing machine;

rescanning the one computing machine in the first computing group to discover that the first set of software products and the delta set of software products are installed thereon; and recalculating an overall usage metric for the first computing group based on a number of computing machines belonging to the first computing group and the discovered first set of software products and delta set of software products.

14. The computer program product of claim 13, wherein the scanning the new computing machine, comparing, adding, rescanning and recalculating is performed iteratively for each additional new computing machine that successively joins the first computing group of the computing infrastructure.

15. The computer program product of claim 13, wherein the scanning the new computing machine, comparing, adding, rescanning and recalculating is performed iteratively according to a schedule.

16. The computer program product of claim 11, wherein calculating the overall usage metric comprises multiplying a license value metric associated with the one scanned computing machine with the number of computing machines belonging to the first computing group, the license value metric being calculated based on the first set of software products.

17. The computer program product of claim 11, wherein the installing a first set of software products in each computing machine is performed by a prime machine that hosts one or more virtual machine templates and is configured for using one of the hosted virtual machine templates for creating at least some of the computing machines as virtual machines in the computing infrastructure and installing the first set of software products thereon.

18. The computer program product of claim 17, wherein each computing machine in the first computing group is created using the same virtual machine template.

* * * * *